Apr. 10, 1923.
M. D. DOMINGUEZ
1,451,537
ELECTRIC HEATER
Filed May 1, 1922
2 sheets-sheet 1
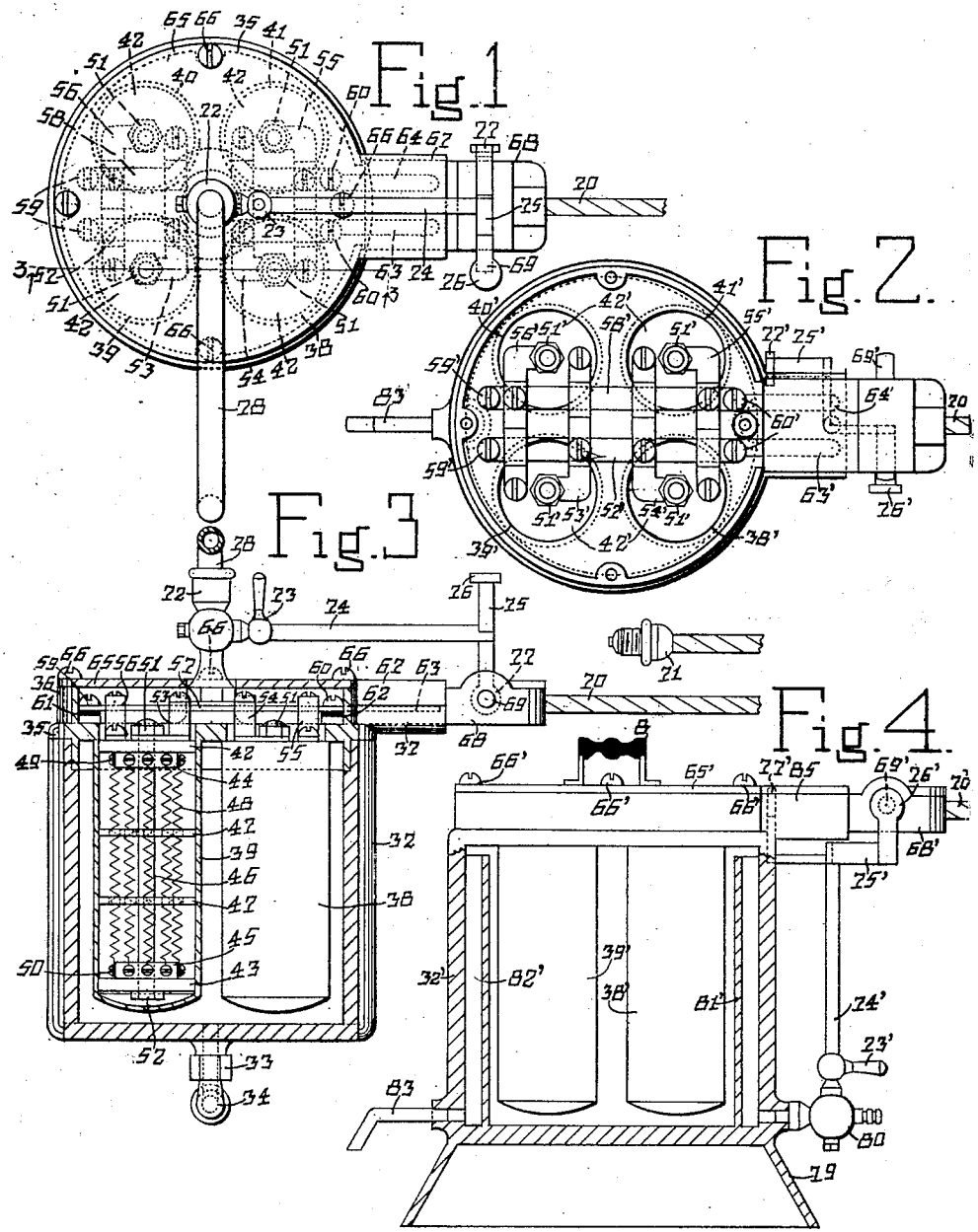
INVENTOR.
Manuel D. Dominguez
BY Browne and Phelps
ATTORNEYS.

Apr. 10, 1923.
M. D. DOMINGUEZ
ELECTRIC HEATER
Filed May 1, 1922
1,451,537
2 sheets-sheet 2
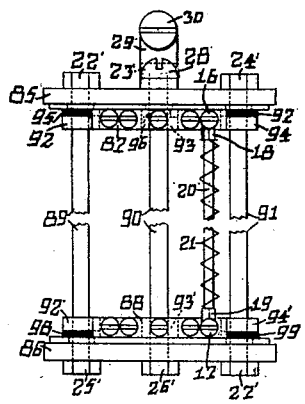
Fig. 5
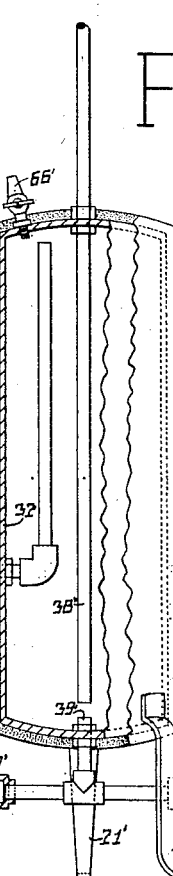
Fig. 6.
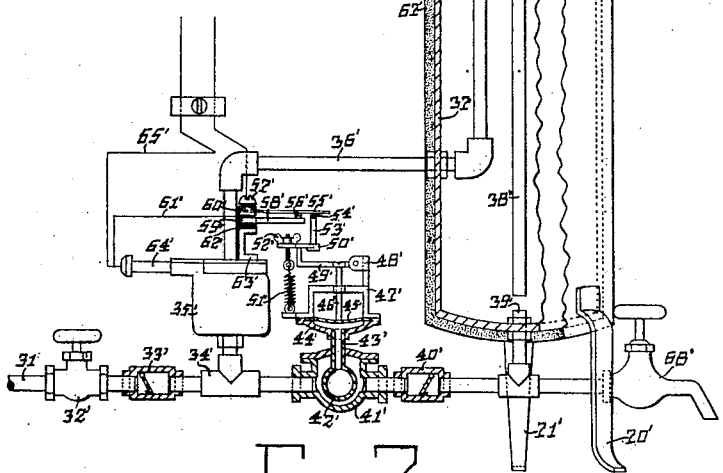
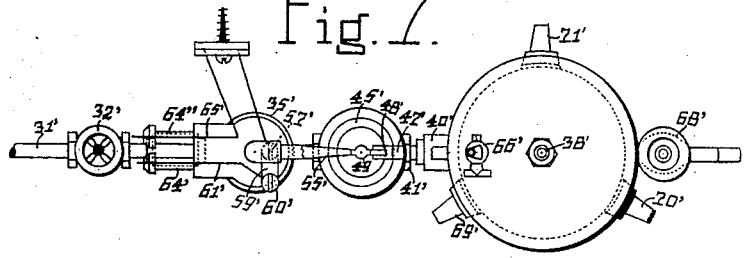
Fig. 7.
INVENTOR.
BY Manuel D. Dominguez
Browne and Phelps
ATTORNEYS.

Patented Apr. 10, 1923.

1,451,537

UNITED STATES PATENT OFFICE.

MANUEL D. DOMINGUEZ, OF NEW ORLEANS, LOUISIANA.

ELECTRIC HEATER.

Application filed May 1, 1922. Serial No. 557,691.

*To all whom it may concern:*

Be it known that I, MANUEL D. DOMINGUEZ, a subject of Spain, residing at New Orleans, in the parish of Orleans and State of Louisiana, have invented certain new and useful Improvements in Electric Heaters, of which the following is a specification.

The invention relates to electric heaters, and has as an object the provision of a heater for heating water.

An object of the invention is the provision of a heater which has readily accessible parts and which will be efficient in operation.

Illustrative embodiments of the invention are shown in the accompanying drawings, in which—

Fig. 1 is a plan view;

Fig. 2 is a similar view with the cover plate removed;

Fig. 3 is a vertical section on line 3—3 of Fig. 1;

Fig. 4 is a central vertical section, partly in elevation, of a modified form;

Fig. 5 is a detail elevation of a modified form of heating element;

Fig. 6 is a side elevation, partly in central vertical section, of a stand boiler, and heating apparatus connected thereto;

Fig. 7 is a plan view of the apparatus shown in Fig. 6.

As shown in Figs. 1, 2 and 3, the device comprises a casing 32, which is water-tight, and is provided with a connecting pipe 78 connected with a union 72 at its top, and a second connecting pipe 34 at its bottom with a union 33 for connection to the casing.

A heater carrying plate 35 is shown as mounted upon the top of the casing 32 and as provided with a plurality of cylinders 38, 39, 40, 41 cast integral therewith and projecting downwardly therefrom. An upward extension 36 of the plate 35 may be covered with a cover plate 65 secured thereto by screws 66, which cover plate may be removed to gain access to the electric connections.

Within each of the cylinders 38—39 there is contained an electric resistance element for heating purposes as shown in Fig. 3. This element comprises upper and lower disks 42—43 of insulating material having disks 44—45 of conducting material secured thereto. To maintain the spacing of the resistance elements 48 disks 47 of insulating material are placed within the cylinder and mounted upon a rod 46 about which the entire element is assembled. The rod 46 is of conducting material, and is placed in electric connection with the lower disk 45 but insulated from the upper disk 44. Nuts 51, 52 are provided to hold the heating element in assembly, and the insulating disks 42—43 may be seated upon shoulders upon the rod if desired. A conducting element 53 is in electric contact with the rod 46, being maintained thereon by means of the nut 51 and a conducting element 56 is electrically connected by means of a screw with the upper disks 44. A pair of bus bars 57—58 are mounted upon the plate 35, being secured thereto by means of screws 59—60 but insulated therefrom as by means of insulating washers 61—62. The bus bars terminate in terminals 63—64 adapted to make electrical contact with socket members carried in a plug 68.

For convenience of attachment to the bus bars 57—58 the connecting element 44 of the conducting rod 46 of cylinder 41 and the conducting element 55 connected to the disk 44 of cylinder 38 are each connected to bus bars 58 by a single screw and the alternate members of these two cylinders are each connected to the other bus bar 57 by a second single screw. The same alternative arrangement of connections is also followed for the connectors of cylinders 39 and 40 to the bus bars.

The plug 68 has connected thereto a duplex cable 70 terminating in an extension plug 71 which may be secured into any convenient socket for a source of electric energy. To control the flow of fluid through the heater a valve may be controlled by a handle 73, and the handle is shown as connected to a rod 74, which rod is in turn connected to a yoke 75 having downwardly extending elements 77 adapted to actuate a switch mounted upon a pivot 69 in the plug 68.

Access may be had to the interior of the casing 32 by merely removing the plate 35 carrying with it the heating element containing cylinders. Moreover access to the electrical connections alone may be had by simply removing the plate 65. If complete removal of the plate is necessary the union 72 must be loosened and the valve removed. The upper portion of the socket 67 is preferably made integral with the plate 65.

The form of the device shown in Fig. 4 comprises a casing 32' mounted upon a base 19, having water connections at 80 and 83, the valve being controlled by means of the handle 73', which handle, by means of rod 74', is adapted to actuate the switch 69' by means of yoke 75' 76'.

A different form of electric heating arrangement is shown in Fig. 5, in which 85 and 86 are disks of refractory insulating material held in separation by means of metallic rods 89, 90 and 91, and in which disks of conducting material 87, 88 are sleeved upon the rods 88—89 and insulated therefrom by means of washers 95—99, and resistance elements, one of which is shown at 21 are slipped over rods 20, preferably of porcelain, which are mounted in sockets 18, 19 and 20, which sleeves are shown as secured to the disks 87, 88 by means of screws 16, 17. The resistance element 21 is in electric connection with the sleeves 18, 19, which serve as conductors of electricity to the said resistance elements.

The washers 95, 96, 97 serve to insulate each of the columns from the conducting disk 87, and the washers 98 and 99 insulate only the columns 89 and 91, column 90 making contact with the disk 88. The disk 87 is connected to terminal 29 by means of a screw 28 and to the source of energy by means of a screw 30. The disk 88 is connected to the other terminal by means of the column 90, which in turn is connected to the terminal by means not shown. The thus constructed heating element may be placed in the cylinders 38—41 already described in connection with Figures 1 to 4 inclusive. The electrical heating device described may be utilized for a system such as is shown in Figures 6 and 7, and in which the fluid to be heated may be contained in a stand boiler 37' of the well known form, having a cold water outlet 38' extending to a point adjacent to the bottom of the boiler and having a pipe 36' terminating at a point adjacent the top of the boiler. A drain valve is shown at 68'. Also an air vent at 66', which may be used when the boiler is being first filled. Preferably the boiler is heat insulated by means of a covering 67'. The boiler is shown as supported by means of feet 69' 70' and 71'. The circulation of the water through the heater is shown as through check valve 40', a thermal element casing 41', T 34', the heater casing 35', the pipe 36'. An inlet for cold water is shown attached to a branch of the T in the form of a pipe 31 having a control valve and a check valve 33' enclosed therein.

The heating element in the casing 35' may be such as has already been described. To control the application of heat to the water a thermal element is shown in the form of a sphere 42' contained in the casing 41', which sphere may contain air or any suitable gas or fluid adapted to expand when heated, the thermal element having at its upper element a concaved disk 44' mounted upon a tube 43'. A diaphragm 45' is secured to the open side of the disk 44' and has contacting with its central portion a rod 46 passing through a yoke 47' mounted upon the disk. The yoke 47' is utilized for the support of a journal 48' which has pivoted thereto a lever 49' adapted to be actuated by the rod 46'. The said lever in its upward movement presses against an element 50' having a stem 53' projecting therefrom carrying a strip of insulating material 54', and adapted to actuate a spring 55' to break contacts 56' when the diaphragm is pressed upwardly by expansion of the thermal material. Mounted upon the cover of the casing 35' is a bracket 63', a bar 58' secured at 59' upon the bracket and insulated therefrom by means of washer 62'. A screw 60' is provided to hold the bar in place. The bar 58' is shown as carrying the stationary contact for control of the current. The movable contact is provided with a screw 57' by means of which one of the conductors is secured to the device. The current is through screw 57', contacts 55', bar 58', wire 61' and plug 64', the heater and the return wire 65'.

A spring 51' is shown as secured to the yoke 47' and to an eye bolt passing through the element 50' whereby the spring pressure upon the rod 46' may be adjusted.

As shown in Fig. 7, the heating element may be supported upon a bracket which may be screwed to any suitable support. By the operation of the thermal element the water in the stand boiler 37' may be preserved at the desired temperature automatically. The heating device provided by the invention will be found to be efficient in service, its parts accessible for inspection, connection or repair and the latter qualities will also assist in cheapening the production of the device.

Minor changes may be made in the physical embodiment of the invention without departing from the spirit thereof.

I claim:

1. An electric heater comprising, in combination, a casing, a removable cover for said casing, cylinders carried by and projecting from said cover, heating elements contained in said cylinders, bus bars attached to said cover, and electrical connections from said bus bars to said heating elements.

2. An electric heater comprising, in combination, a casing, a cover therefor, cylinders cast integral with said cover and closed at their ends opposite the cover, electrical heating elements housed in said cylinders, a flange projecting from said cover to provide a recess about the open ends of said cylinders, bus bars mounted in said recess, electrical connections between said elements and said bus bars.

3. An electric heater comprising, in combination, a casing, a cover for said casing having cylinders projecting therefrom and closed at the end opposite said cover, a flange projecting from said cover providing a recess therein, bus bars mounted in said recess and insulated from said cover, said bus bars extended to provide terminals for coaction with a slip socket, electrical heating elements housed in such cylinders, connections between said elements and said bus bars, and a cover plate for said recess.

4. An electric heater comprising, in combination, a casing, a cover therefor, cylinders cast integral with said cover and closed at their ends opposite the cover, electrical heating elements housed in said cylinders, a flange projecting from said cover to provide a recess about the open ends of said cylinders, bus bars mounted in said recess, electrical connections between said element and said bus bars, inlet and outlet water connections for said casing.

5. An electric heater comprising, in combination, a casing, a cover therefor, cylinders cast integral with said cover and closed at their ends opposite the cover, electrical heating elements housed in said cylinders, a flange projecting from said cover to provide a recess about the open ends of said cylinders, bus bars mounted in said recess, electrical connections between said elements and said bus bars, inlet and outlet water connections for said casing, a plug adapted to make contact with said bus bars, a switch carried by said plug, a valve in one of said water connections, and means connecting said valve and switch whereby electrical current will be supplied to said heating elements when water is allowed to flow through said casing.

6. A heating element for water heaters comprising, in combination, a rod of conducting material, a pair of insulating disks mounted upon said rod in spaced relation, a pair of disks of conducting material mounted upon said first named disks, one of said conducting disks insulated from said rod, resistance elements connected to said conducting disks, a terminal connected to said insulated conducting disk, and a second terminal connected to said rod.

MANUEL D. DOMINGUEZ.